United States Patent [19]
MacLaughlin et al.

[11] Patent Number: 4,515,651
[45] Date of Patent: May 7, 1985

[54] APPARATUS FOR OSCILLATORY BONDING OF DISSIMILAR THERMOPLASTIC MATERIALS

[75] Inventors: Donald N. MacLaughlin, Midland, Mich.; Vincent E. Fortuna, Huntington Beach, Calif.

[73] Assignee: Vercon Inc., Dallas, Tex.

[21] Appl. No.: 644,189

[22] Filed: Aug. 27, 1984

Related U.S. Application Data

[63] Continuation-in-part of Ser. No. 371,363, Apr. 23, 1982, Pat. No. 4,462,849.

[51] Int. Cl.³ .............................................. B29C 27/08
[52] U.S. Cl. ................................. 156/423; 156/379.8; 156/380.9; 156/499; 156/567; 156/580; 156/580.1; 228/2; 228/1.1
[58] Field of Search ...................... 156/69, 73.1, 73.5, 156/73.6, 82, 228, 273.3, 293, 294, 304.1, 304.5, 304.6, 309.9, 322, 279.8, 380.9, 423, 499, 567, 580, 580.1, 580.2; 264/23, 68; 425/174.2, DIG. 22; 228/1 R, 1 B, 2, 110, 112

[56] References Cited

U.S. PATENT DOCUMENTS

| | | | |
|---|---|---|---|
| Re. 29,448 | 10/1977 | Brown et al. | 156/73.5 |
| 2,252,854 | 8/1941 | Hubner et al. | 156/82 |
| 3,463,843 | 8/1969 | Taylor et al. | 264/68 |
| 3,494,817 | 2/1970 | Whitecar | 156/580.1 |
| 3,701,708 | 10/1972 | Brown et al. | 156/582 |
| 3,708,376 | 1/1973 | Mistarz et al. | 156/580 |
| 3,860,468 | 1/1975 | Scherer | 156/73.1 |
| 4,140,058 | 2/1979 | Ballreich et al. | 156/73.1 |
| 4,235,154 | 11/1980 | Hotton | 156/580 |
| 4,407,691 | 10/1983 | Ishii et al. | 156/82 |

Primary Examiner—Michael Wityshyn
Attorney, Agent, or Firm—Michael J. Caddell

[57] ABSTRACT

Apparatus is disclosed for the bonding together of two similarly shaped articles made of dissimilar thermoplastic materials, utilizing oscillator motion between the two articles combined with an external heat source to generate sufficient heat to form a hermetic seal therebetween.

20 Claims, 8 Drawing Figures

APPARATUS FOR OSCILLATORY BONDING OF DISSIMILAR THERMOPLASTIC MATERIALS

CROSS REFERENCES TO RELATED APPLICATION

This application is a continuation-in-part of a prior copending application, Ser. No. 371,363, filed Apr. 23, 1982, now U.S. Pat. No. 4,462,849, by Donald N. MacLaughlin and Vincent E. Fortuna, for "Method and Apparatus for Oscillatory Bonding".

BACKGROUND OF THE INVENTION

The present invention relates generally to the bonding together of two similarly shaped portions of thermoplastic articles and more particularly involves friction welding of upper and lower container sections made of dissimilar plastics, to provide a single hermetically welded container.

The prior art discloses a method of welding container sections together to form a single container, which method is directed to cylindrically shaped thermoplastic containers which are rotated at high speeds against each other to generate by friction the heat necessary to bond the two sections together. This prior art method is commonly referred to as spinwelding and is disclosed in such patents as U.S. Pat. No. 3,297,504, U.S. Pat. No. 29,448 and U.S. 3,499,068.

While the prior art method of spinwelding is advantageous over such methods as chemical bonding, cementing and thermal bonding by means such as laser, electron beam, radio wave, and electrical means, it offers disadvantage in that it is restricted to cylindrical joints. Obviously two non-cylindrical container sections could not be successfully spinwelded because of their lack of surfaces which would maintain contact during relative rotary motion between them.

The present invention overcomes the disadvantage of rotary spinwelding by providing methods and apparatus for friction welding thermoplastic containers having non-cylindrical joinder sections as well as being applicable also to cylindrical sections. The present invention utilizes an external heat source combined with oscillatory motion, rather than rotary motion, between the two sections to be joined to provide the friction for generating the final stage of heating for bonding the two sections. Dissimilar plastics can be bonded using the present methods and apparatus.

DESCRIPTION OF THE PREFERRED EMBODIMENTS

The present invention is a modification and improvement over the apparatus disclosed in U.S. Pat. Nos. 3,499,068 and Re. 29,448, which patents are herein incorporated by reference in their entirety. For ease of description, the present invention will be described with reference to only one station of a multi-station system such as the multi-station systems disclosed in the above-mentioned incorporated patents. Except for the modifications disclosed with respect to the single described station, the remainder of the container-forming system of this invention is substantially the same as that of the incorporated patents.

Figure 4:
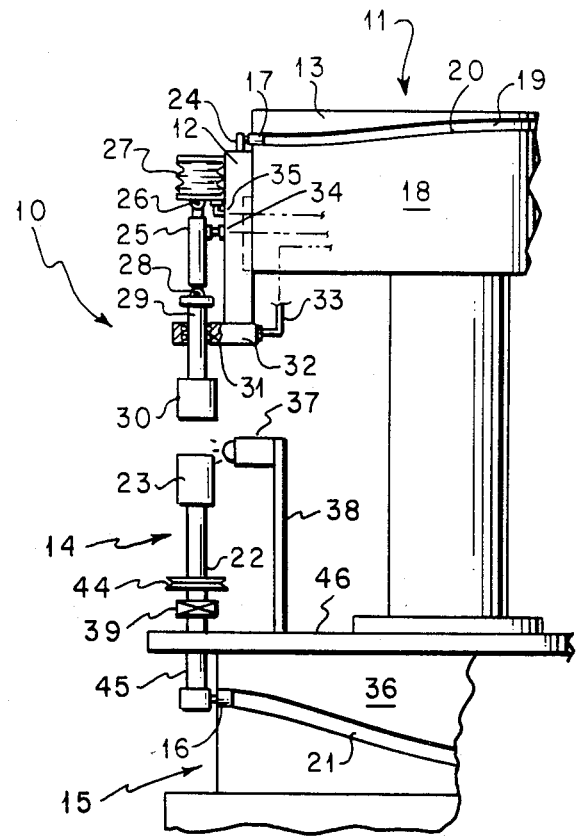
FIG. 4 is a partial side view of an oscillatory welding apparatus for low-frequency welding.

Referring first to FIG. 4, a single station 10 of the bonding system 11 is shown in side elevational view. The single station 10 is typical of the other stations contained on the multiple station rotary system. The station comprises an upper carrier assembly 12 mounted by rollers on upper cam head 13. The lower carrier assembly 14 is mounted in a lower cam assembly 15 by roller follower means 16. Upper assembly 12 is mounted in cam head 13 by roller follower 17.

Upper cam head 13 generally comprises a substantially circular, vertical cam plate 18 having formed therein a peripheral cam groove 19. Cam groove 19 passes circumferentially around cam head 13 and is arranged to receive roller follower 17 in relatively close-fitting engagement therein. Cam channel 19 has vertical fluctuations such as shown at 20 for providing controlled vertical movement of carrier assembly 10 as it rotates about cam head 13.

Likewise, lower cam assembly 15 contains a peripheral cam channel 21 encircling a generally circular-shaped cam head 36 and arranged to receive cam follower 16 rotatably therein. Cam channel 21 likewise has vertical fluctuations for providing vertical movement of lower assembly 14 with respect to upper assembly 10.

Lower assembly 14 generally comprises a vertical upper spindle shaft 22 to which is attached a tool 23 for receiving and tightly clamping the lower portion of the container to be bonded. Tool 23 preferably has an internal cavity facing upward and shaped generally to conform to the shape of the lower container portion to be bonded. Furthermore, tool 23 has conventional means such as a vacuum system for selectively gripping the lower container portion therein. Shaft 22 is rotatably mounted by bearing 39 on a lower spindle shaft 45, which in turn mounts on cam follower 16. A pulley 44 or other drive means, such as a gear or wheel, is secured to upper spindle shaft 22 to provide drive means for selectively rotating the upper shaft and tool 23.

An external heating element 37 is fixedly mounted by support 38 on base 46 of the apparatus. It is directed toward and in close proximity to tool 23.

Upper carrier head 12 is joined by shaft 24 to cam follower 17. Cam follower 17 is rotatably mounted on shaft 24. Also mounted on carrier head 12 is an air oscillator 25 acting through a pin joint 26 to an oscillatory diaphram 27 which in turn is fixedly attached to carrier head 12. Oscillator 25 has a slidable shaft 28 extending downwardly therefrom to which is connected an upper tool spindle 29 having an upper tool 30 attached thereto. Tool spindle 29 passes through air bearing 31 mounted in a bearing housing 32 which is fixedly attached to carrier head 12. Air bearing 31 allows slidable vertical movement between spindle 29 and carrier assembly 10. Upper tool 30 has conventional means such as vacuum means for tightly gripping the upper portion of the container to be joined to the lower portion held in tool 23. An air supply source 33 provides air to bearing 31 and a second air supply source 34 provides air to diaphram 27. Oscillatory diaphram 27 is connected to oscillator 25 to provide amplitude adjustment of the oscillatory motion generated therein.

In typical operation, a pair of upper and lower container portions are denested from a stack thereof by a separate denesting assembly (not shown) and rotated through the various conveying systems associated with the aforementioned incorporated patented structures such that a bottom portion is secured within tool 23 and an upper portion held in upper tool 30. The movement of carriers 12 and 14 around the circular cam heads 13 and 36 provides vertical cammed movement between tools 23 and 30 to bring the container sections into close proximity.

After the container sections are brought into close proximity and immediately prior to their being joined together, the lower tool 23 comes to its closest position with respect to external heating element 37 and simultaneously is rotated one or more revolutions to obtain even heating of the component held therein. Rotation may be accomplished by engaging drive pully 44 with an external V-belt (not shown) in a manner disclosed in the aforementioned incorporated Reissue patent. While the container component in tool 23 is being rotated, a power source is turned on at the heating element 37 thereby generating heat which is directed toward the container component. Element 37 can be of any conventional heating source such as quartz, infrared, and other radiant heaters, electrical resistance heaters, radiowave and microwave heaters, gas or oil flame, hot air or steam jets, ultrasonic generators, and equivalent heat-generating means.

Several alternative heating schemes can be utilized. For example, if the container components have non-circular welding areas, then it is necessary that they be indexed during or after rotation in order to maintain proper alignment of the two components after rotation. This can be achieved through conventional mechanical or optical indexing alignment means or can be done by making drive pulley 44 a geared wheel and driving the wheel an exact and controlled rotational displacement for each cycle of the apparatus.

Another alternative is to utilize a heat source that provides approximately 360 degrees of heating around the component so that the need for rotation of tool 23 is eliminated. This can be done by having permanently-installed heating elements on each tool 23 or by having a heating element that projects and retracts cyclically around one single tool at a time. The projecting and retracting can be either vertical or radial, or a combination of both, geared to the rotation of carrier assemblies 14 around base 15.

Alternatively, heating of the container components can be achieved by providing heating elements in or on one or both tools 23 and 30, directed generally vetically and slightly inward, to heat the plastic component being held in the opposite tool. As an example, a ring-shaped radiant heater or a circular pattern of hot air jets can be located along the very bottom surface of tool 30 and directed primarily towards the position occupied by the frictionwelding portion of the container component held in tool 23. These heating elements can be automatically activated by switch means associated with cam groove 19.

As the carrier assembly 12 and 14 progress around the apparatus and move into close proximity to each other by means of cam grooves 19 and 21, one or more of the external heating sources are activated and one or both of the plastic welding zones on the container components are heated circumferentially utilizing one of the methods discussed above.

Since one of the advantages to the present invention is to frictionweld dissimilar plastics by oscillatory welding, it would be preferable in this instance to provide all or most of the external heating on the plastic component having the higher melt temperature. For example, if one component has a melt temperature 80° F. higher than that of the other components, it would be preferable to initially heat the surface of the higher melt component about 40° to 120° F., prior to oscillatory welding.

When the carrier assemblies 12 and 14, which transverse circularly around cam heads 13 and 15 as a single unit, have reached a predetermined point with respect to cam grooves 19 and 21, tools 23 and 30 will have moved into their closest position thus bringing the upper and lower container sections into conjoining relationship. Simultaneously, with the joining of the upper and lower container sections, air is supplied via tube 34 to the air oscillator 25 thus providing a low frequency oscillation of the upper container section held in tool 30 within the lower container section clamped in tool 23 to sufficiently generate enough additional heat between the two container sections to provide an hermeticly sealed bond therebetween. The number of oscillations necessary to provide bonding depend upon various parameters including the amount of preheating utilized, the type of plastic utilized in the containers, as well as the container size and the frequency and amplitude of the oscillations. These will be known to the operator prior to adjusting the machinery, and the time and frequency of the oscillations will have been preset such that at the moment bonding is beginning, the oscillations will be terminated to allow the container sections to form a good bond. The air oscillator terminates oscillations in the lowermost position such that the container sections will be fully joined. Shortly after the oscillations have ceased and bonding has been achieved, movement of the carrier assemblies 12 and 14 around cam heads 13 and 15 by means of the engagment of cam followers 16 and 17 in cam grooves 19 and 21 will move the carrier assemblies vertically apart and allow removal of the bonded container sections. These will then be transported via conventional means away from the bonding assembly.

Figure 5:
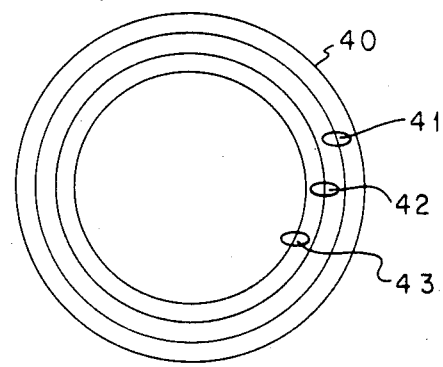
FIG. 5 is a schematic view of a rotary air joint for use with the apparatus of FIG. 4.

FIG. 5 is the schematic representation of the rotary air joint to which air supply tubes 33, 34 and 35 are connected. FIG. 5 illustrates the rotary joint 40 having an air supply outlet 41 to connect with diaphragm supply tube 35, a second air supply port 42 connectable to air oscillator supply tube 34, and a third air supply port 43 connectable to air bearings supply tube 33. As the carrier assemblies 12 and 14 are rotated about their respective cam heads 13 and 15, the air supply ports 41–43 communicate with the various supply tubes to supply a properly timed sufficient quantity of air into the various air actuated components of the assembly.

Figure 6:
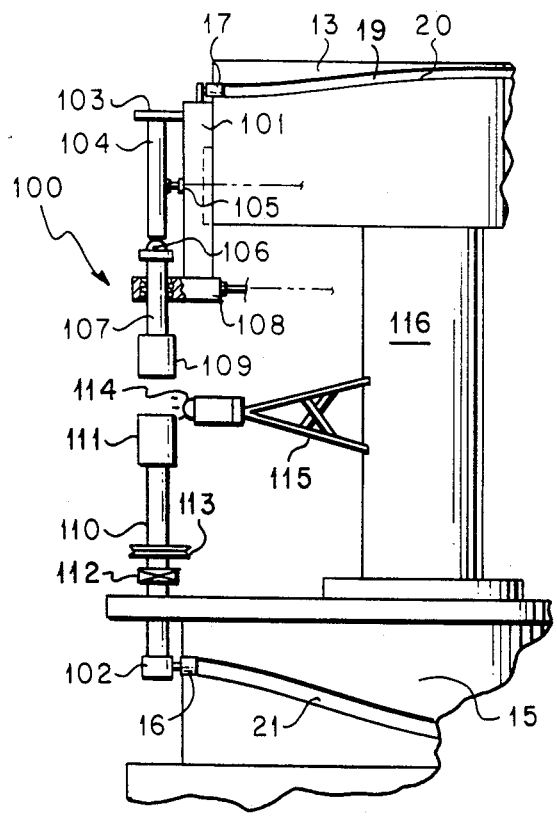
FIG. 6 is a partial side view of an oscillatory welding apparatus for high-frequency welding.

Referring now to FIG. 6, the second embodiment of the invention is disclosed, which embodiment is particularly useful for high frequency oscillatory bonding of container parts. In this embodiment the carrier assembly of the first embodiment has been replaced by a high frequency carrier assembly 100. This carrier assembly is mounted on similar cam heads 13 and 15 by roller followers 17 and 16. Assembly 100 comprises an upper carrier body 101 and a lower roller body 102. Upper tool body 101 has located thereon a mounting bracket 103 which mounts an ultrasonic transducer 104 lying in a vertical plane substantially parallel to cam plate 13. Transducer 104, which is electrically operated, is connected to a power source via electrical connection 105. At the lower end of transducer 104 is a pin connection 106 connecting an upper spindle 107 to the transducer. An air bearing 108 connected to body 101 supports spindle 107 in vertically slidable orientation. An upper container retention tool 109 is secured at the lower end of spindle 107. Retention tool 109 preferably has an internal cavity formed in the general shape of the container top to be welded. The lower assembly 102 comprises a lower spindle 110 mounted on carrier block 102 and having a lower container retention tool 111 mounted at the top thereof. Tool 111 has an internal cavity similarly shaped to the lower portion of the plastic container to be welded. Tools 109 and 111 have conventional means for clamping tightly onto container sections.

Tool 111 may be rotatably mounted by bearing 112 and contain a drive pulley or gear 113. Although a pulley 113 is illustrated, more accurate rotation by means of exact indexing can be obtained when welding non-circular components by substituting a gear for pulley 113.

An external heating source 114 of the type mentioned above, or its equivalent, is mounted by frame 115 to stationary center column of the apparatus. Heating source 114 is directed toward the tool holder which is arranged to receive the plastic component having the higher melt temperature. Alternatively, the heat source can be attached to or be formed integrally with one of the tools 109 and 111, or can be retractable either vertically or radially. These alternative heating techniques remove the need for rotation means 112 and 113.

In typical operation, the two carrier assemblies comprising a single station 100, will be rotated about their respective cam plates 13 and 15 with roller followers 17 and 16 engaged in cam grooves 20 and 21. This rotary movement and concurrent camming action around plates 13 and 15 by the station assembly results in a vertical movement of the upper and lower spindles toward and away from each other. At one point in this operation, while the upper and lower tools 109 and 111 are spaced apart, a plastic container top will be located in tool 109 and a plastic container bottom will be located in tool 111 by means conventional in the art. Additional movement of the cam followers in their respective cam channels serves to translate the upper and lower spindles toward each other until the upper and lower plastic container sections are brought into close proximity to each other. The external heating element 114 is then activated and circumferential heating of the preselected component is achieved either by rotating the component, or by heating with a ring heater, as previously described.

The plastic sections are then brought together into telescopic engagement by means of cam grooves 19 and 21. At this point in time, the transducer will be supplied with electric power through lead 105 causing a very high frequency oscillation of the upper spindle 107 to occur, which in turn oscillates the upper plastic container with respect to the lower plastic container, setting up friction forces which result in a high heat generation and a subsequent welding of the upper and lower container sections together to form an hermetic seal. The continuous movement of the assembly around the cam plates then spreads the upper and lower spindles apart, allowing removal of the welded container unit from the upper and lower tools by known means.

Figure 7:
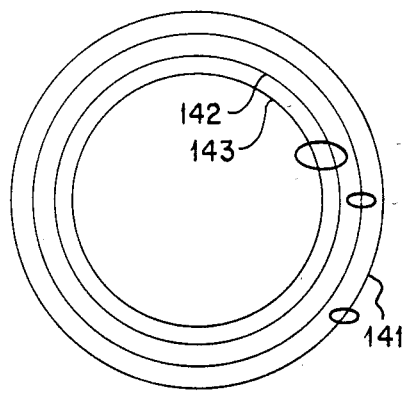
FIG. 7 is a schematic diagram of the rotary joint to provide air and electrical power to the apparatus of FIG. 6.

FIG. 7 is a schematic diagram of a rotary joint located near the central longitudinal axis of the total assembly. In FIG. 7, the circuits for the electrical supply are indicated at 142 and 143. An air supply is connected to a rotary air joint 141 to provide air to the bearing 108 in a manner similar to that of FIG. 5. In addition, conventional means such as vacuum or mechanical means can be provided in the tool holders 109 and 111 to secure the plastic containers therein during the oscillatory welding stage.

Figure 8:
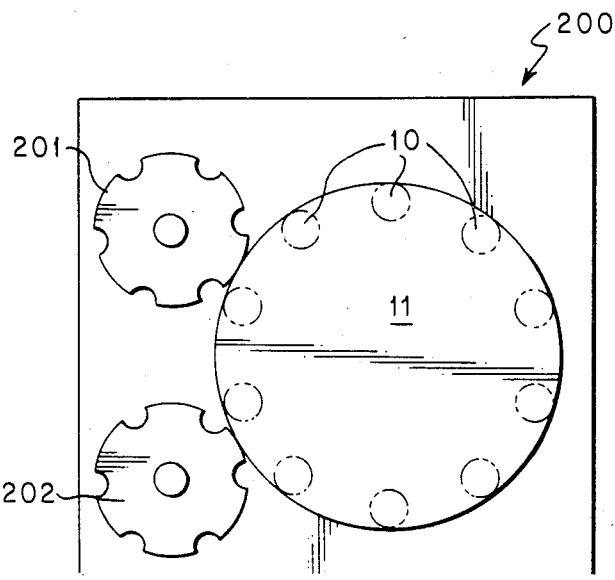
FIG. 8 is a schematic top view of the rotary infeed and exit system for the oscillatory welding apparatus.

FIG. 8 is a plan schematic view of a feed system 200 for the bonding assembly. The feed system comprises a rotary infeed such as starwheel 201, providing delivery of containers into the various stations 10, and the exit wheel 202 comprising a starwheel for removing the bonded containers after the welding process has been accomplished. The multi-station oscillatory welding system 11 is shown having ten individual welding stations 10 illustrated.

Figure 1:
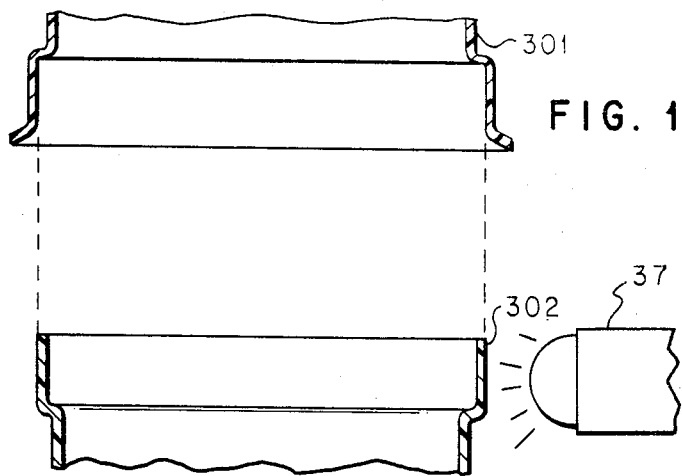
FIGS. 1–3 are cross-sectional side views of three different types of container joints which can be joined utilizing the present invention.
Figure 2:
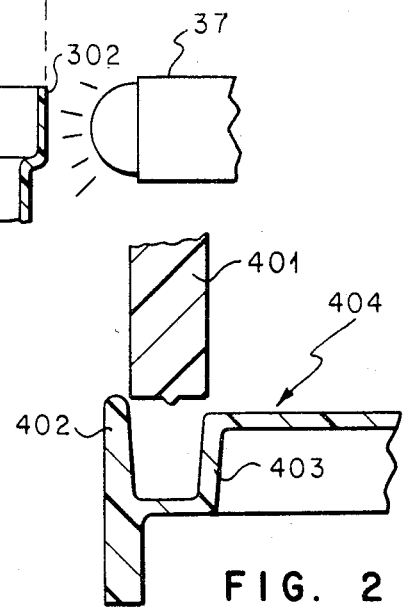
Figure 3:
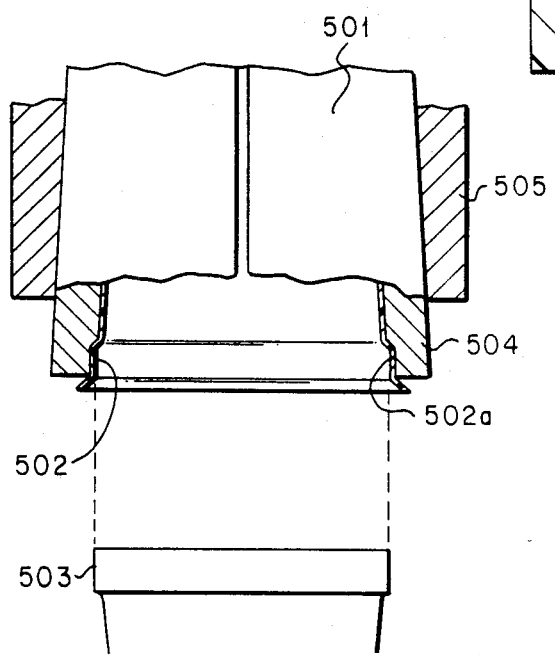

FIGS. 1-3 illustrate various joints that can be welded utilizing the present assembly and rigid plastic container sections. FIG. 1 illustrates a partial cross-sectional view of upper container section 301 which is fused to a lower container section 302 with the assistance of heating element 37. This type of joint is normally referred to as a "compressive shear" joint. The outer diameter of the lower section 302 is preferably a few thousandths of an inch larger than the inner diameter of the upper section 301. Section 301 is forced over section 302 to provide an air-tight fit and the oscillation between the two sections provides, through the pre-added heat and the heat of friction, a sufficient melting of the thermoplastic material to form a tight hermetic bond therebetween.

FIG. 2 represents a partial cross-sectional side view of a fusion joint between two plastic articles, such as two sections of a container, or a container wall and a container bottom. This type of joint is generally referred to as an "energy director" joint. In this joint, the side wall 401 of a container section is oscillated between upwardly extending flanges 402 and 403 of a plastic bottom section 404. The wall section 401 preferably has a slight interference fit in-between upper flanges 402 and 403 to provide sufficient friction heat to bond the bottom section to the wall 401.

FIG. 3 illustrates an alternate embodiment of the clamping function of the upper tool 501 of a container section 502. The container section 502 is to be friction welded to the lower container section 503. In this embodiment, a wedge shaped clamp 504 connected to a first cam track located on upper cam plate 13 grips the container member 502. Member 504 is wedge shaped into a diverging orientation at the lower end and a slidable tightening ring 505 is located around the outer periphery of the wedge shaped clamping member. A second cam track located on the upper cam plate directs the vertical movement of clamping member 505 downward on wedge member 504 to provide an inward compression of container member 502. The timing of the first and second cam tracks on the upper cam member is such that member 505 is lowered on member 504 to compress container member 502 down upon container member 503 after container member 503 has just entered the barrel flange area 502a. Thereupon, member 505 is moved downward to compress clamp 504 and container 502 into compression on container 503. After the downward clamping motion of outer member 505, oscillations are generated in the entire upper assembly to oscillate member 502 over 503 and provide sufficient heat of friction to bond the two container sections together.

Thus a welding system for friction welding plastic containers had been disclosed which is particularly advantageous for the joining of two thermoplastic container sections which are of a non-circular cross-sectional configuration and made of dissimilar plastics. The present invention utilizes oscillatory axial motion as oppposed to the conventional rotary motion of prior art spin-welders. The oscillatory motion, being a translational motion rather than a rotating motion, allows containers of almost any cross-sectional configuration to be friction welded together. In addition, preheating one or both elements provides several appreciable benefits in the container making process. One previously mentioned benefit is the joining of dissimilar plastics having wide variations in melt temperatures. Another is welding plastics to non-plastics such as paperboard. Another benefit is that preheating allows the use of less interference fit which reduces scarfing and destructive forces in the weld zone. Lower frequencies of welding can also be used because of preheating which reduces stresses in the final weld. The present invention discloses embodiments for low frequency oscillatory welding of dissimilar plastic articles, and also apparatus for high frequency oscillatory welding of such articles.

Although a specific embodiment of the present invention has been described in the detailed description above, the description is not intended to limit the invention to the particular forms or embodiments disclosed therein since they are to be recognized as illustrative rather than restrictive and it will be obvious to those skilled in the art that the invention is not so limited. For example, whereas electrical transducers and air operated oscillatory apparatus are disclosed for providing oscillatory welding action, it is clear that other means such as hydraulic action and mechanical oscillations could be utilized in their place. Also, whereas the top container portion is oscillated in contact with the bottom container section, it is possible to oscillate the bottom section instead, or to even oscillate both sections of the container. Thus the invention is declared to cover all changes and modifications of the specific examples of the invention herein disclosed for purposes of illustration which do not constitute departures from the spirt and scope of the invention.

The embodiments of the invention in which an exclusive property or privilege is claimed are defined as follows:

1. Apparatus for oscillatory friction welding a thermoplastic polymer component to a component made of a dissimilar material, said apparatus comprising:
   a first holder adapted for securing a first component to be welded, comprising first holding means and a first receptacle for receiving said first component;
   said first holder being mounted on a tool adapted for axial sliding movement;
   said tool being mounted on a carrier assembly;
   oscillator means connected to said first tool and said carrier assembly and arranged to oscillate said first tool axially with respect to said carrier assembly;
   a second holder secured to a spindle mount and adapted for holding a second article to be welded to said first article, said second holder being axially aligned with said first holder in close proximity thereto, and comprising a receptacle for receiving said second article;
   means for moving said first and second holders in axially reciprocating movement toward and away from each other; and
   an external heat generator mounted in close proximity to at least one of said holders and arranged to direct heat against a welding surface of a component held in said close proximity holder.

2. The apparatus of claim 1 wherein said holder in close proximity to said heat generator is further adapted to rotate about its vertical axis.

3. The apparatus of claim 2 further comprising means for rotating said holder in close proximity to said generator.

4. The apparatus of claim 1 wherein said heat generator is adapted to heat a circumferential surface.

5. The apparatus of claim 1 wherein said heat generator is selected from the group consisting of radiant heaters, jet heaters, radio frequency heaters, flame heaters, microwave heaters, and ultrasonic heaters.

6. The apparatus of claim 1 wherein said generator is a quartz heater.

7. The apparatus of claim 1 wherein said generator is an infrared light source.

8. The apparatus of claim 1 wherein said generator is a heated air jet.

9. An oscillatory bonding system for friction welding two thermoplastic polymer components made from dissimilar thermoplastic polymers, said system comprising:
   an upper mandrel for holding a first plastic component in vertical axial orientation;
   a lower mandrel for holding a second plastic component in vertical axial alignment with said first component;
   at least one of said mandrels being adapted for rapid oscillatory axial movement;
   at least one of said mandrels being adapted for substantial vertical displacement;
   means for axially displacing one of said mandrels; and,
   a heat generator for applying external heat to a plastic component held in one of said mandrels, said generator being arranged for placement in close proximity to one of said mandrels.

10. The oscillatory bonding system of claim 9 wherein said mandrel in close proximity to said generator is further adapted for rotation about its vertical axis.

11. The oscillatory bonding system of claim 9 wherein said generator is adapted for circumferential movement around said mandrel.

12. The oscillatory bonding system of claim 9 wherein said heat generator is an integral part of one of said mandrels.

13. The oscillatory bonding system of claim 12 wherein said integral generator is directed substantially toward said other mandrel.

14. The oscillatory bonding system of claim 12 wherein said integral generator is directed toward the component area of said mandrel containing said generator.

15. The oscillatory bonding system of claim 9 wherein said heat generator comprises a heating element selected from the group consisting of infrared heaters, quartz heaters, electrical resistance heaters, radiant heaters, radio frequency heaters, microwave heaters, lasers, hot air jets, steam jets, flame heaters, and ultrasonic heaters.

16. A multi-station friction welding assembly for the oscillatory bonding together of at least two thermoplastic articles made of dissimilar plastics; said assembly having at least two bonding stations thereon and comprising:
   a stationary base portion;
   an upper assembly mounted on said base portion;
   a lower assembly mounted on said base portion below said upper assembly;
   said upper and lower assemblies adapted to maintain circumferential alignment with each other on said base portion;
   at least one of said upper and lower assemblies further adapted to be moved axially back-and-forth with respect to the other assembly on said base portion;
   means for moving at least one of said upper and lower assemblies axially back-and-forth with respect to the other;
   each said bonding station further comprising:
      a first holder slidably mounted on one of said upper and lower assemblies, adapted to receive and clamp a first thermoplastic article to be bonded;
      oscillating means on said first holder for oscillating said holder axially on said assembly; and,
      a second holder on the other of said upper and lower assemblies, axially aligned with said first holder, and adapted to receive and clamp a second thermoplastic article to be bonded to a first thermoplastic article;
   selective power means for supplying actuating power to said oscillating means and said holders at said bonding stations;
   heat generating means arranged for directing heat selectively towards at least one of said holders in each of said bonding stations;
   said moving means being adapted to move said first holder back-and-forth between a first position where said thermoplastic articles are separated and a second position where said thermoplastic articles are telescopically engaged with each other;
   said oscillating means being adapted to oscillate only when said first and second holders are in said article-engaged position, and said oscillating means further comprising frequency and amplitude adjusting means adapted to allow adjustment of the amplitude and frequency of said oscillating action to maintain said thermoplastic articles in telescopic engagement during oscillation thereof; and,
   said heat generating means being adapted to heat a circumferential portion of a component in one of said holders prior to said article-engaged position.

17. The multi-station welding assembly of claim 16 wherein said heat generating means is fixedly mounted on said assembly and at least one of said holders in each said bonding station is further adapted to rotate about its vertical axis when passing in close proximity to said heat generating means.

18. The multi-station welding assembly of claim 16 wherein said heat generating means is located on at least one of said holders in each said bonding station.

19. The multi-station welding assembly of claim 16 wherein said heat generating means is movably mounted on said assembly and arranged for reciprocatory movement into and away from a position in close proximity to at least one of said holders.

20. The welding assembly of claim 19 wherein said heat generating means is further adapted for substantially encircling said holders.

* * * * *